2 Sheets--Sheet 1.

T. H. MITCHELL.
Improvement in Operating Valves for Steam-Engines.

No. 130,654.  Patented Aug 20, 1872.

WITNESSES:
Thomas Mitchell
Amanda H. Mitchell

INVENTOR:
Thomas H. Mitchell.

2 Sheets--Sheet 2.
T. H. MITCHELL.
Improvement in Operating Valves for Steam-Engines.
No. 130,654                      Patented Aug. 20, 1872.
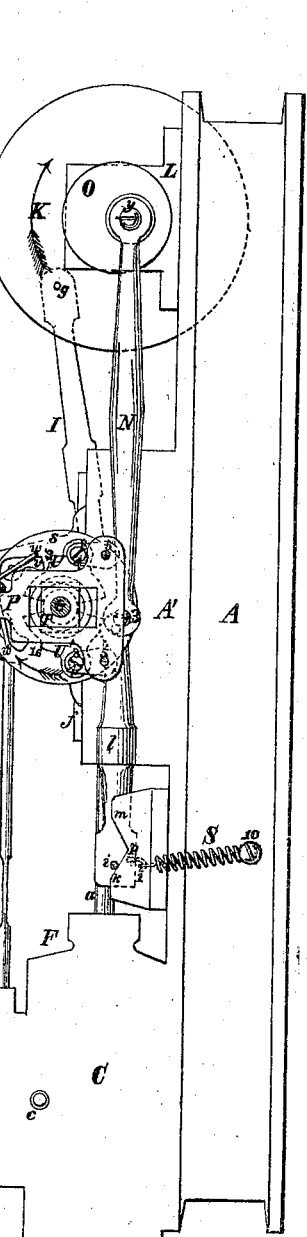
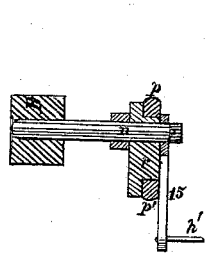
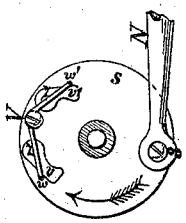
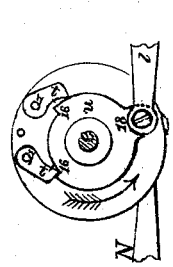
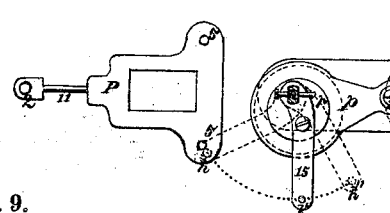
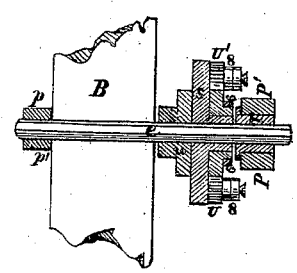
WITNESSES:
Thomas Mitchell.
Amanda H. Mitchell.
INVENTOR:
Thomas H. Mitchell.

UNITED STATES PATENT OFFICE.

THOMAS H. MITCHELL, OF ALBANY, NEW YORK.

IMPROVEMENT IN OPERATING-VALVES FOR STEAM-ENGINES.

Specification forming part of Letters Patent No. 130,654, dated August 20, 1872.

SPECIFICATION.

*To all whom it may concern:*

Be it known that I, THOMAS H. MITCHELL, of Albany, in the county of Albany, in the State of New York, have invented new and useful Improvements in Steam-Engines; and I do hereby declare that the following is a full and exact description thereof, reference being had to the accompanying drawing and to the letters of reference marked thereon making a part of this specification.

To enable others skilled in the art to make and use my invention, I will proceed to describe its construction and operation.

Figure 1:
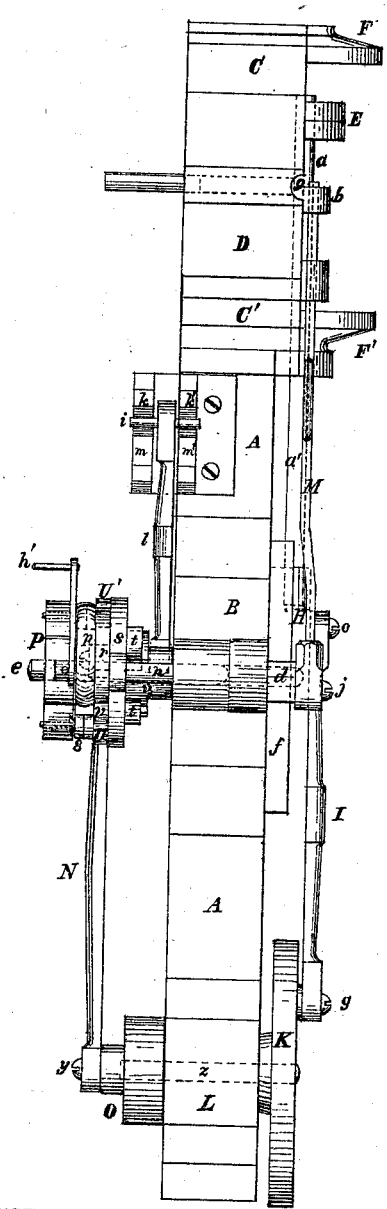
Figure 2:
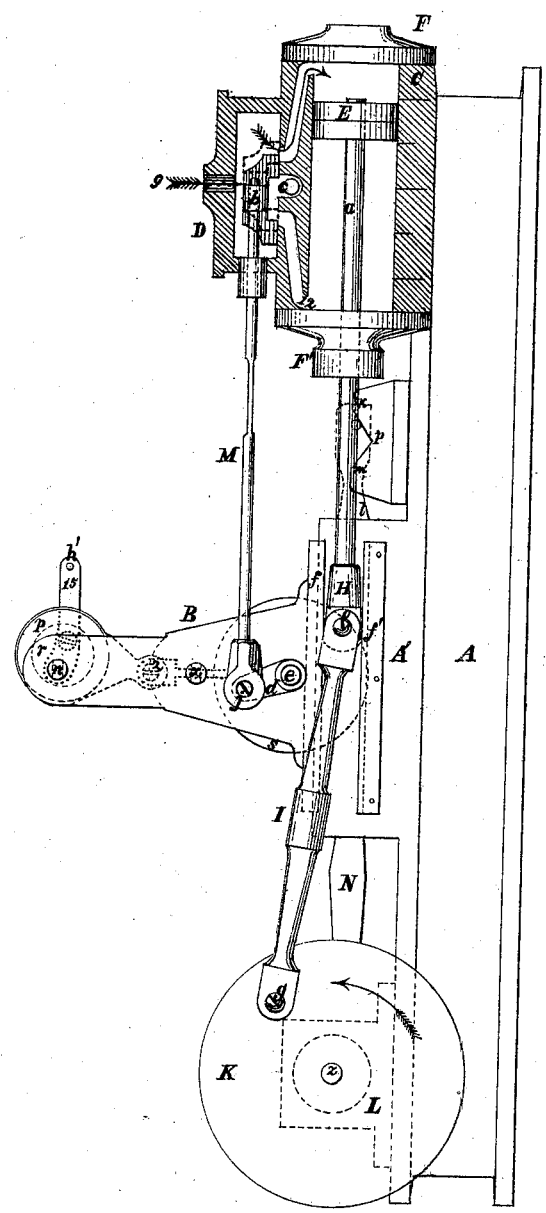

The drawing represents a horizontal engine. Figure 1 is a top view of the engine. Fig. 2 is a side view of engine, partly in section. Fig. 3 is the opposite-side view of engine. Fig. 4 is a horizontal sectional view of post B and eccentric pin $n$. Fig. 5 is a view of rocking plate. Fig. 6 is a view of rocking plate and notched wheel. Fig. 7 is a view of the halved cams with links attached. Fig. 8 is a view of the slotted adjuster P. Fig. 9 is a horizontal sectional view of post B and rock-shaft $e$ and connections, as described.

A A' is the bed-plate. C is the cylinder. D is the steam-chest. E is the piston. F F' are the cylinder-heads. H is the cross-head. K is the crank-plate. L is the pillow-block. M is the main valve-rod. O is the eccentric flange. P is the slotted adjuster. U U' are the halved cams. $a$ is the piston-rod. $b$ is the main valve. $c$ is the exhaust-port. $e$ is the rock-shaft. $d$ is the arm keyed to the rock-shaft $e$. $j$ is the screw which connects the valve-rod M to the arm $d$. I is the main rod connecting the cross-head H with the crank-pin $g$ of plate K. $o$ is the screw-joint in cross-head H. $f f'$ are the guides to cross-head H. Z is the engine-shaft.

Fig. 2 shows a perpendicular section of steam-cylinder C and steam-chest D. N is the rod connecting the eccentric pin $y$ of eccentric plate O to rocking plate $s$ at joint 3. $v\ v'$ are pawls, having fulcrums passing through rocking plate $s$, as also shown in Fig. 5 by 7 7. $w\ w'$ is a spring, for the purpose of forcing the pawls $v\ t\ v'\ t'$ against the notched wheel $u$ and half-cams $u\ u'$. This spring is fastened to rocking plate $s$ at screw-joint V. T is a square box, fitting loose on rock-shaft $e$. 1 is a hook fastened into rod $l$, attaching spring $s$ to it. 8 8 are links connecting the adjuster P with the halved cams U U' at joints 5 5 and 4 4. X is the permanent guide to rod 11 of adjuster P. $n$ is a permanent shaft fastened into post B on which the eccentric $r$ plays. $p$ is the eccentric-strap of eccentric $r$, and is connected by rod 11 of adjuster P by screw-pin 2. $h'$ is the pin to which an engine-governor may be attached. The lever 15, to which the pin $h'$ is attached, is firmly fastened to the eccentric $r$. $u$ is a wheel with a section of the periphery cut away forming two shoulders, against which the two pawls $t\ t'$ play. $l$ is a rod, in which the pin $i$ is fastened, and the opposite end of rod $l$ is attached to the notched wheel $u$ by the screw-pin 13, as also shown in Fig. 6. $m\ m'\ k\ k'$ are the highest points of the four inclined planes, and terminate at the lowest point $p$. S is the spring attached to the hook 1 and screw 10, which is screwed into bed-plate A A'. The arrow on the crank-plate K shows the direction the crank should move. The arrows in the steam-chest D and cylinder C show the direction which the steam takes as it enters the inlet 9.

The operation of the engine is as follows: The steam passes through the inlet 9, taking the direction of the arrows of steam-chest D and cylinder C, as shown in Fig. 2, pressing against piston E, and is exhausting on the opposite side of piston E through port 12, and so on, out of the exhaust-port $c$; and as soon as the piston has reached one-fourth of the length of its stroke all communication is closed from the steam-chest D and exhaust-port $c$, the piston E traveling the remainder of the stroke by the expansion of the steam, which it has received from the steam-chest D. The broken lines in steam-chest D show the main valve $b$ when in position to close the ports, as before described. The steam on the exhaust side of piston E having exhausted, and the main valve being closed over the three ports, there is a vacuum which inclines the exhaust side of the piston toward cylinder-head F', shown in Fig. 2. A vacuum takes places after the steam is exhausted and is retained by the closing of the main valve $b$. Pin $h'$ may be controlled by hand or a governor when attached to it. When pin $h'$ is in the position as seen in the drawing, the apparatus, which is controlled by this pin, trips the pawls $v\ t\ v'$ $t'$ when the piston E arrives at one-fourth of the stroke. As the strap $p$ is connected with rod 11 at joint 2, said rod being fastened to adjuster P, the perpendicular motion of adjuster P is guided by the square box T fitting loosely on rock-shaft $e$, and is under the control of pin $h'$ by means of eccentric $r$. Now, as the adjuster P is connected by links 8 8 to the half cams U U', these cams are controlled by moving the pin $h'$ toward $h$, the distance between 12 12 of cams U U' is shortened, and thus cuts off the steam shorter, and by moving the pin $h'$ in the opposite direction it lengthens the cut-off. Spring $w\ w'$ presses the pawls $v\ t$ against the half cams, shown in part by broken lines of Fig. 3, and in full by Fig. 7, and also against the notched wheel $u$, as in Fig. 6. The four pawls $v\ t$ and $v'\ t'$, Figs. 5 and 6, have two pins, 7 7, which pass through the rocking plate, and are keyed into the pawls at the extremities of the pins; thus the pawls work in pairs, each pair moving in unison. The rocking plate $s$ of Fig. 3 is moved by being connected to the eccentric pin $y$ by means of the rod N; thus the rocking plate $s$ moves uniformly with the eccentric, not connected to the rock-shaft except through the working of the pawls $t\ t'$ moving in and out of notches 16 16, of wheel $u$, as shown in Fig. 6. The pin $i$ of rod $l$, having reached the point it now occupies on the inclined plane $k$, as shown by letters $k'\ k'$ of Fig. 1, the piston E is supposed to have reached one-fourth the length of its stroke, the pawl $v'$ strikes the half cam U at point 12, and, being connected with the pawl $t'$, it rises out from against the shoulder 16 of notched flange $u$. The spiral spring S being attached to the connecting-rod $l$ by means of hook 1, the pin $i$ passing through rod $l$, resting on the inclined planes at $k\ k'$, said spring S inclines the pin $i$ back to its former position at $p$. The pawl $t'$, being thrown out from against the notch at 16, the pin $i$ returns to its position at $p$. When the notched flange $u$ moves in the opposite direction from the arrow of flange $u$ its motion corresponds with that of pin $i$, being connected by rod $l$. Now, as the notched flange $u$ returns pawl $t$ drops into the other notch 16, and the same motion is repeated after the crank-pin $g$ has made half of a revolution in the direction of the arrow on crank-plate K. The notched flange $u$ is keyed to the rock-shaft $e$, as is also the arm $d$. The main valve $b$ is connected with the valve-rod M, being also connected at screw-joint $j$ with the arm $d$; thus the main valve may be controlled by hand, or regulated by a governor, when connected with the pin $h'$. The four inclined planes $k\ k'\ m\ m'$ meet at $p$ of Fig. 3, corresponding with the broken lines in steam-chest D, showing the main valve $b$ as covering the ports having lap enough over the width of each of the three ports, so as to cover them steam-tight; thus there is no communication between the cylinder C, steam-chest D, or exhaust-port $c$ of Fig. 2; thus the vacuum becomes serviceable.

It will be perceived, by means of the apparatus herein described, that the regular revolutions of the engine-shaft $z$ is controlled by hand or a governor. The main valve $b$, when in the position of the broken lines, cuts off the steam and closes the exhaust-port $c$, thus securing the vacuum and assisting the motion of the piston E. An oscillating valve may be used instead of a flat valve for the main valve. It will also be perceived that when the pin $h'$ is moved in the direction of the dotted arc to $h$, the motion of the main valve ceasing serves as a throttle, closing off the head of steam from the cylinder C, and when pin $h'$ is at $h''$ the steam-cylinder receives the full head of steam.

Having thus described my invention, what I claim, and desire to secure by Letters Patent, is—

The combination of the rocking-plate $s$, pawls $v\ t\ v'\ t'$, guide $x$, rod 11, links 8 8, cams U U', notched wheel $u$, adjusted by the running gear of a governor, or by hand, with inclined planes $m\ k$, pin $i$, and spring S, all arranged to operate the valve $b$, substantially as set forth.

THOMAS H. MITCHELL.

Witnesses:
THOMAS MITCHELL,
AMANDA H. MITCHELL.